Oct. 24, 1961  S. W. KLONOSKI ET AL  3,005,497
FAN BLADE AND HUB ASSEMBLY
Filed July 22, 1957  2 Sheets-Sheet 1
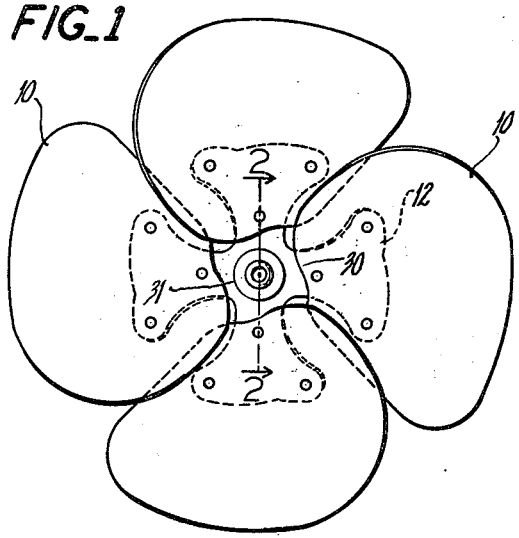
FIG_1
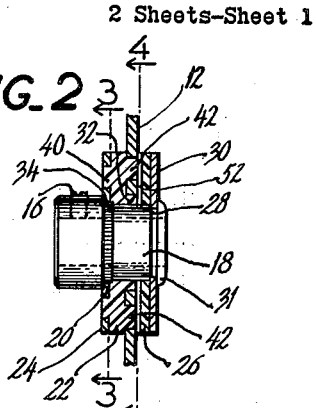
FIG_2
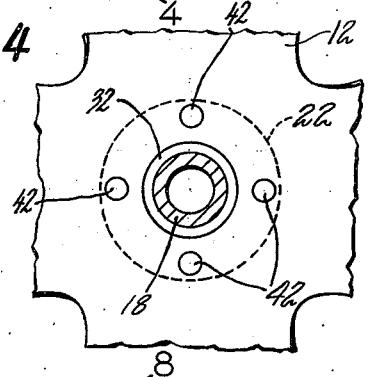
FIG_4
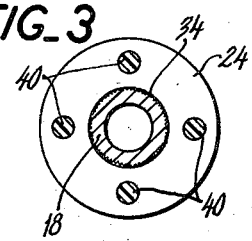
FIG_3
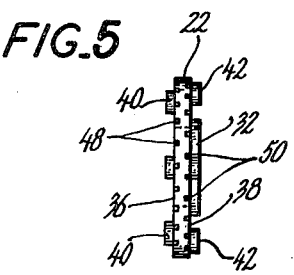
FIG_5
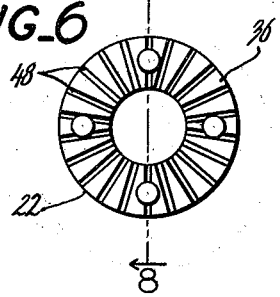
FIG_6
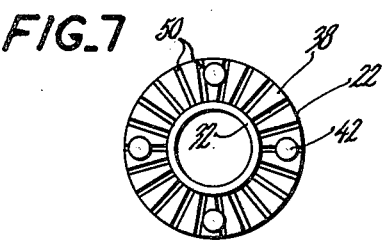
FIG_7
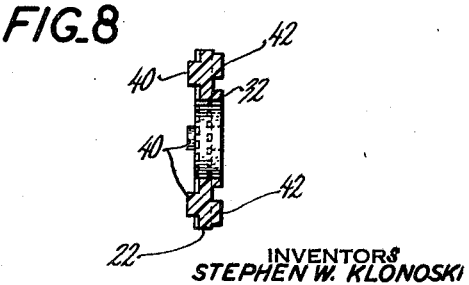
FIG_8
INVENTORS
STEPHEN W. KLONOSKI
KENNETH A. MERZ
BY Teller & McCormick
ATTORNEYS Oct. 24, 1961 S. W. KLONOSKI ET AL 3,005,497
FAN BLADE AND HUB ASSEMBLY
Filed July 22, 1957 2 Sheets-Sheet 2
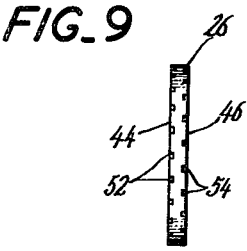
FIG_9
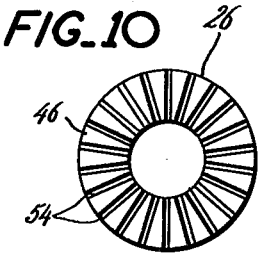
FIG_10
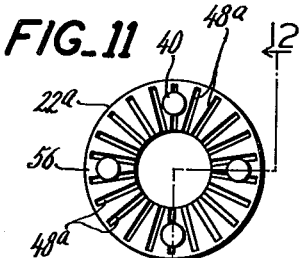
FIG_11
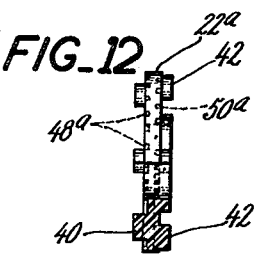
FIG_12
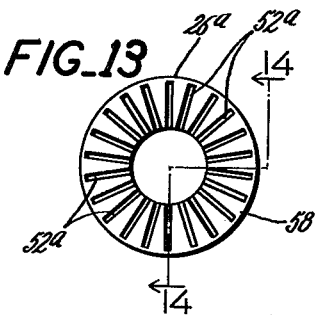
FIG_13
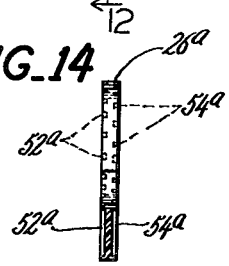
FIG_14
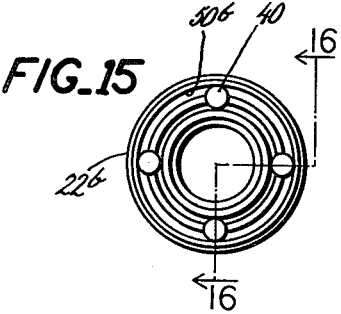
FIG_15
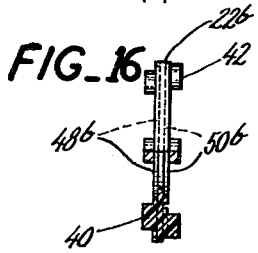
FIG_16
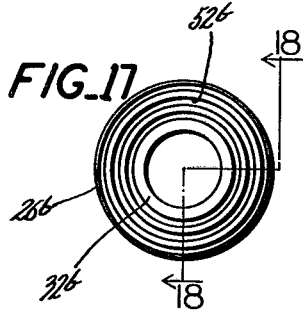
FIG_17
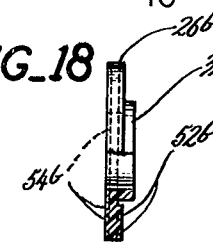
FIG_18
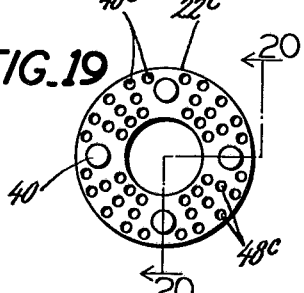
FIG_19
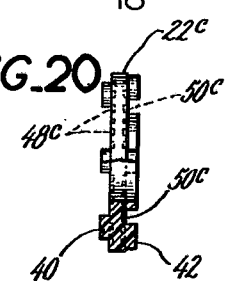
FIG_20
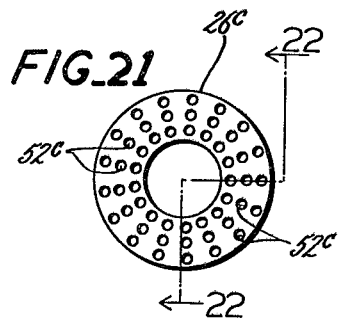
FIG_21
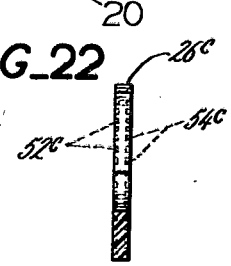
FIG_22
INVENTORS
STEPHEN W. KLONOSKI
KENNETH A. MERZ
BY Teller & McCormick
ATTORNEYS United States Patent Office 3,005,497
Patented Oct. 24, 1961

1

3,005,497
FAN BLADE AND HUB ASSEMBLY
Stephen W. Klonoski, Torrington, and Kenneth A. Merz, Cornwall, Conn., assignors to The Torrington Manufacturing Company, Torrington, Conn., a corporation of Connecticut
Filed July 22, 1957, Ser. No. 673,193
8 Claims. (Cl. 170—160.53)

The invention relates to a fan blade and hub assembly of the type wherein the blades and the blade carrier are connected with the metallic portion of the hub solely by means of rubber supporting and driving elements. Such rubber elements provide limited flexibility of drive and serve to reduce the vibration and the sound that would otherwise be present.

One of the objects of the present invention is to provide a fan blade and hub assembly of the said type wherein one of the rubber elements is so constructed and so related to other parts that it provides a positive drive from the hub to the blade carrier.

Another object of the invention is to provide a fan blade and hub assembly of the stated type wherein there are two rubber elements at opposite sides of the blade carrier, and wherein said elements are compressed from their initial thickness to an accurately predetermined extent.

Another object of the invention is to provide a fan blade and hub assembly wherein there are two rubber elements at opposite sides of the blade carrier and between washers carried by the hub, and wherein the faces of said rubber elements that engage said carrier and washers are provided with grooves or other depressions having sharp corners, said grooves or depressions increasing the flexibility of connection and substantially reducing sound and said grooves or depressions by reason of their said sharp corners increasing the torque transmitted from the hub to the carrier.

The drawings show several embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a front view of a fan blade and hub assembly embodying the invention.

FIG. 2 is a fragmentary sectional view taken along the line 2—2 of FIG. 1.

FIG. 3 is a sectional view taken along the line 3—3 of FIG. 2.

FIG. 4 is a sectional view taken along the line 4—4 of FIG. 2.

FIG. 5 is a side view of a first rubber element.

FIG. 6 is a rear view of the element shown in FIG. 5.

FIG. 7 is a front view of the element shown in FIG. 5.

FIG. 8 is a vertical sectional view taken along the line 8—8 of FIG. 6.

FIG. 9 is a side view of a second rubber element.

FIG. 10 is a rear view of the element shown in FIG. 9.

FIG. 11 is a rear view of an alternative first rubber element.

FIG. 12 is a combined elevational and sectional view of the element shown in FIG. 11, the sectional portion of the view being taken along the line 12—12 of said FIG. 11.

FIG. 13 is a rear view of an alternative second rubber element.

FIG. 14 is a combined elevational and sectional view of the element shown in FIG. 13, the sectional portion of the view being taken along the line 14—14 of said FIG. 13.

FIG. 15 is a rear view of another alternative first rubber element.

FIG. 16 is a combined elevational and sectional view of the element shown in FIG. 15, the sectional portion of the view being taken along the line 16—16 of FIG. 15.

FIG. 17 is a rear view of another alternative second rubber element.

FIG. 18 is a combined elevational and sectional view of the element shown in FIG. 17, the sectional portion of the view being taken along the line 18—18 of FIG. 17.

FIG. 19 is a rear view of still another alternative first rubber element.

FIG. 20 is a combined elevational and sectional view of the element shown in FIG. 19, the sectional portion of the view being taken along the line 20—20 of FIG. 19.

FIG. 21 is a rear view of still another alternative second rubber element.

FIG. 22 is a combined elevational and sectional view of the element shown in FIG. 21, the sectional portion of the view being taken along the line 22—22 of FIG. 21.

Referring to the drawings, FIG. 1 shows a fan having four similar blades 10, 10 all attached to a central sheet metal carrier or spider 12. As shown, the blades are structurally separate from the carrier 12, but the invention is not so limited. Said blades and said carrier or spider are or may be of conventional construction.

As shown in FIGS. 2, 3 and 4, the fan is provided with a hub which is centrally apertured to receive and fit a drive shaft, not shown. The hub may be connected with the shaft by means of a set screw 16. The front end portion 18 of the hub has a reduced diameter which provides a forwardly facing first shoulder at 20. A means is provided for supporting a first anular rubber element 22 and this means is preferably a relatively thin rigid washer 24 which fits said hub portion 18 and is seated against said first shoulder 20. Said first rubber element 22 fits said hub portion 18 and engages said washer 24 at the front thereof. The before-mentioned spider or carrier 12 surrounds the hub portion 18 and engages said first rubber element 22 at the front thereof. Fitting said hub portion 18 and engaging said spider or carrier 12 at the front thereof is a second rubber element 26. Said hub portion 18 has an annular rabbet at the front which provides a forwardly facing second shoulder 28. Seated in said rabbet and engaging said shoulder 28 is a rigid washer 30 which engages the front face of the second rubber element 26. During assembly and after the parts 22, 24, 12, 26 and 30 are in place, an initially projecting annular flange on the hub portion 18 is spun or peened over to engage the washer 30 as shown at 31. Thus the washer 30 is locked in place and all of the before-mentioned parts are retained in assembled relationship.

The first and second hub elements 22 and 26 have been referred to as "rubber" elements. The term "rubber" has been used for convenience of description, but it will be understood that this term is intended to be generic and is intended to include not only rubber but all reasonably suitable rubber substitutes.

One of the rubber elements 22 and 26 is preferably provided with an annular flange 32 which projects into and fits a corresponding central opening in the spider or carrier 12. This flange serves to center the carrier on the hub and to prevent any metal-to-metal engagement. As shown, the flange 32 is on the first rubber element 22, but the invention is not so limited.

One of the washers 24 and 30 is positively connected with the hub for rotation therewith. As shown it is the washer 24 that is so connected. The hub is provided with a series of serrations 34 and the washer 24 is forced into place so that the serrations bite into the washer. Thus the washer 24 is positively connected with the hub.

When the rear washer 24 is the one that is positively driven by the hub, the first rubber element 22 is a grommet which is formed as shown in detail in FIGS. 5 to 8. Said grommet or element comprises a main body or disc which has flat rear and front faces 36 and 38 engaging respectively with the front face of the washer 24 and with the rear face of the carrier 12. The body of the element 22 is centrally apertured to receive and fit the hub portion 18. Projecting from the rear face 36 of the element 22 are integral lugs 40, 40 which enter and fit corresponding holes in the washer 24 as shown in FIG. 3. The lugs 40, 40 and the corresponding holes are preferably equally spaced from the axis and equally spaced circumaxially. Four lugs and four holes are shown, but the invention is not so limited. Each of the holes in the washer 24 which receive the lugs 40, 40 has continuous peripheral walls substantially perpendicular to the faces of the washer, and each of the lugs 40, 40 is of such size and shape that it fits the corresponding hole. Projecting from the front face 38 of the element 22 are integral lugs 42, 42 which enter and fit corresponding holes in the carrier 12 as shown in FIG. 4. The lugs 42, 42 are spaced similarly to the lugs 40, 40, but they are preferably at a slightly greater distance from the axis. Each of the holes in the carrier 12 which receive the lugs 40, 40 has continuous peripheral walls substantially perpendicular to the faces of the carrier, and each of the lugs 42, 42 is of such size and shape that it fits the corresponding hole. When the number of lugs 42, 42 is the same as the number of lugs 40, 40, said lugs 42, 42 are preferably in the same radial planes as the lugs 40, 40 as shown, but this is not essential.

When the first rubber element 22 is a driving grommet as shown and described, the second rubber element 26 may be a washer as shown in detail in FIGS. 9 and 10. Said washer or element 26 has flat rear and front faces 44 and 46. The washer or element 26 is or may be exactly like the grommet or element 22 except that it does not have any flange such as 32 or any lugs such as 40, 40 and 42, 42.

It will be observed that the spider or carrier 12 is held solely by the rubber elements 22 and 26. The flange 32 on the element 22 serves to center the spider so that it is concentric with the axis of the hub. The hub is initially machined so that the second shoulder 28 is spaced at an accurately predetermined distance from the first shoulder 20. The initial aggregate thickness of the several parts 22, 24, 12 and 26 is greater by a predetermined amount than the distance of said second shoulder 28 from said first shoulder 20, and the result is that said rubber elements 22 and 26 are compressed to an exactly predetermined extent by the washer 30 when the latter is locked in place. Thus the spider or carrier 12 and the blades 10, 10 carried thereby are firmly but resiliently connected with the hub.

As before stated, the washer 24 is positively connected with the hub by means of the serrations 34. The first rubber element 22 is positively connected with the washer 24 by means of the lugs 40, 40. The spider or carrier 12 is positively connected with the element 22 by means of the lugs 42, 42. Thus there is a positive drive connection from the hub to the carrier, and the carrier and blades are positively driven notwithstanding the resiliency of the mounting.

Preferably the flat rear and front faces 36 and 38 of the element 22 are not continuous, but are provided with interruptions or depressions so that only portions of the areas of said faces actually engage the washer 24 and the carrier 12. The depressions in each face have an aggregate area at said face that is substantially less than one-half of the total face area. The interruptions or depressions may be widely varied, but as shown in FIGS. 5 to 8 said faces 36 and 38 are provided with a plurality of uniformly spaced radial grooves 48 and 50. Said grooves preferably have their sides perpendicular to the faces 36 and 38 so as to provide sharp preferably rectangular corners.

Preferably the flat rear and front faces 44 and 46 of the element 26 are not continuous, but are provided with interruptions or depressions similar to those for the faces 36 and 38 of the element 22. As shown, said faces 44 and 46 have radial grooves 52 and 54.

The depressions or grooves such as 48, 50 and 52, 54, particularly when provided with sharp corners, serve to grip the corresponding faces of the washer 24 and of the carrier 12 and of the washer 30 so as to transmit rotative driving force from the hub to the carrier. As before stated, the carrier is positively driven by means of the lugs 40, 40 and 42, 42, but the elements 22 and 26 when provided with depressions or grooves as described serve to transmit torque additional to that transmitted by the lugs, the lugs being thus relieved of a certain amount of shearing stress.

The depressions or grooves such as 48, 50 and 52, 54 also serve to greatly reduce the sound or motor hum which would otherwise be transmitted from the hub to the carrier and blades. It has been found by experiment and test that the efficacy of the depressions or grooves for reducing sound is considerably dependent upon the degree of compression of said elements 22 and 26. The degree of compression is accurately determined, as before explained, by the relationship between the aggregate thickness of the parts 22, 24, 12 and 26 in relation to the distance between the hub shoulders 20 and 28. Thus by proper design the maximum sound reducing effect can be provided.

FIGS. 11 and 12 show an alternative first rubber element 22$^a$ and FIGS. 13 and 14 show an alternative second rubber element 26$^a$. The elements 22$^a$ and 26$^a$ are or may be exactly like the elements 22 and 26 except that they are provided with radial grooves 48$^a$, 50$^a$, 52$^a$ and 54$^a$ which are like the corresponding grooves in the elements 22 and 26 except that they are closed at their outer ends by thin webs 56 and 58. When the fan is to be used in an installation where appearance is important, said webs 56 and 58 provide smooth unbroken exteriors and therefore improve appearance. Furthermore, said webs 56 and 58 exclude dust, chemical fumes and the like from the grooves and thus assist in preventing deterioration of the rubber.

FIGS. 15 and 16 show another alternative first rubber element 22$^b$ and FIGS. 17 and 18 show another alternative second rubber element 26$^b$. The elements 22$^b$ and 26$^b$ are or may be exactly like the elements 22 and 26 except that, in lieu of radial grooves, they are provided with concentric annular grooves 48$^b$, 50$^b$, 52$^b$ and 54$^b$. The annular grooves may be less effective for transmitting driving force, but they are at least equally effective for reducing sound. They do not permit the entry of dust or other foreign substances.

While the elements 22$^b$ and 26$^b$ may be like the elements 22 and 26 except as stated, said FIGS. 15 and 16 omit any flange such as 32 on the element 22$^b$ and said FIGS. 17 and 18 show a flange 32$^b$ on the element 26$^b$ in lieu of any flange on the element 22$^b$. This flange 32$^b$ has exactly the same function as the flange 32 on the element 22, said flange 32 being described in connection with FIGS. 5 to 8.

FIGS. 19 and 20 show still another alternative first rubber element 22$^c$ and FIGS. 21 and 22 show still another alternative second rubber element 26$^c$. The elements 22$^c$ and 26$^c$ are or may be exactly like the elements 22 and 26, except that in lieu of radial grooves, they are provided with radial rows of circular indentations 48$^c$, 50$^c$, 52$^c$ and 54$^c$. The circular indentations are effective for providing additional driving force and also for reducing sound. They do not permit the entry of dust or other foreign material.

It will be understood that the invention is not limited as to the provision of similar grooves or depressions in the first and second rubber elements. For instance, without departing from the invention, the second rubber element 26$^c$ as shown in FIGS. 21 and 22 might be used with the first rubber element 22$^a$ as shown in FIGS. 11 and 12. Other combinations are obvious.

The invention claimed is:

1. The combination in a rotary fan, of a hub centrally apertured to fit a drive shaft and rotatable about the axis of said shaft and having a forward portion of reduced diameter with a forward facing shoulder at the rear of said portion, said hub having an annular series of serrations adjacent said first shoulder, a thin flat blade carrier perpendicular to said axis and having blades thereon which carrier has a central opening through which said reduced portion of the hub extends and also has a plurality of holes therein each spaced from the central opening and having continuous peripheral walls substantially perpendicular to the faces of said carrier, a rigid washer engaging said hub shoulder and engaging said serrations so as to be positively connected to said hub for rotation therewith which washer has a plurality of holes therein each spaced from said axis and having continuous peripheral walls substantially perpendicular to the faces of said carrier, first and second rubber elements surrounding the hub and respectively engaging the blade carrier at the opposite faces thereof, said first rubber element having a pluality of preformed integral lugs at one side thereof which project into and fit the peripheral walls of the holes in said rigid washer and said first rubber element also having a plurality of preformed integral lugs at the opposite side thereof which project into and fit the peripheral walls of said holes in said carrier to provide a positive drive from said washer to said carrier, and a second washer carried by the hub and engaging said second rubber element and serving to apply longitudinal pressure to firmly hold said rubber elements in engagement with said faces of the blade carrier.

2. The combination in a rotary fan, of a hub centrally apertured to fit a drive shaft and rotatable about the axis of said shaft, a thin flat blade carrier perpendicular to said axis and having blades thereon which carrier has a central opening through which a portion of the hub extends, a first rigid washer surrounding said hub and connected therewith at the rear of the carrier, a second rigid washer surrounding said hub and connected therewith at the front of the carrier, a first rubber element surrounding the hub and having opposite flat faces respectively in pressed engagement with the front fact of the first rigid washer and with the rear face of the carrier, and a second rubber element surrounding the hub and having opposite flat faces respectively in pressed engagement with the front face of the carrier and with the rear face of the second rigid washer, said faces of said first and second rubber elements having a plurality of uniformly spaced depressions therein with sharp corners which depressions in each face have an aggregate area at said face that is substantially less than one-half of the total face area and which depressions and corners in all of said faces augment the transmission of torque from the rigid washers to the carrier and which depressions and corners minimize the transmission of sound to said carrier and blades.

3. A rotary fan as set forth in claim 2, wherein the depressions in the faces of the rubber elements are radial grooves.

4. A rotary fan as set forth in claim 3, wherein said radial grooves are closed at their outer ends.

5. A rotary fan as set forth in claim 2, wherein the depressions in the faces of the rubber elements are concentric annular grooves.

6. A rotary fan as set forth in claim 2, wherein the depressions in the faces of the rubber elements are uniformly distributed circular indentations.

7. The combination in a rotary fan, of a hub centrally apertured to fit a drive shaft and rotatable about the axis of said shaft, a thin flat blade carrier perpendicular to said axis and having blades thereon which carrier has a central opening through which a portion of the hub extends and also has a plurality of holes therein each spaced from said central opening and having continuous peripheral walls substantially perpendicular to the faces of said carrier, a first rigid washer surrounding said hub and connected therewith at the rear of the carrier, a second rigid washer surrounding said hub and connected therewith at the front of the carrier, one of said washers having holes therein each spaced from said axis and having continuous peripheral walls substantially perpendicular to the faces of said carrier, a first rubber element surrounding the hub and having opposite flat faces respectively in pressed engagement with the front face of the first rigid washer and with the rear face of the carrier, and a second rubber element surrounding the hub and having opposite flat faces respectively in pressed engagement with the front face of the carrier and with the rear face of the second rigid washer, one of said rubber elements having a plurality of preformed integral lugs at one side thereof which project into and fit the holes in the last said rigid washer and also having a plurality of preformed integral lugs at the opposite side thereof which project into and fit the holes in said carrier and said faces of said first and second rubber elements having a plurality of uniformly spaced depressions therein with sharp corners which depressions in each face have an aggregate area at said face that is substatnially less than one-half of the total face area and which depressions and corners augment the transmission of torque from the rigid washers to the carrier and which depressions and corners minimize the transmission of sound to said carrier and blades.

8. The combination in a rotary fan, of a hub centrally apertured to fit a drive shaft and rotatable about the axis of said shaft and having a forward portion of reduced diameter with a forward facing first shoulder at the rear of said portion, said hub being formed at its forward end with a rabbet which provides a forward facing second shoulder spaced at a predetermined distance from said first shoulder, a thin flat blade carrier perpendicular to said axis and having blades thereon which carrier has a central opening through which said reduced portion of the hub extends, a first rigid washer surrounding said reduced hub portion and engaging said first shoulder, a first rubber element surrounding the reduced hub portion and having opposite flat faces respectively engaging the front face of the first rigid washer and the rear face of the carrier, a second rubber element surrounding the reduced hub portion and having opposite flat faces with the rear face engaging the front face of the carrier, said first washer and said first rubber element and said carrier and said second rubber element having an initial aggregate thickness greater by a predetermined amount than said distance of said second hub shoulder from said first hub shoulder and said faces of said first and second rubber elements having a plurality of uniformly spaced depressions therein with sharp corners which depressions in each face have an aggregate area at said face that is substantially less than one-half of the total face area, and a second rigid washer surrounding said rabbet of the hub and engaging the front face of the second rubber element, said second washer having been forced rearwardly by a peened portion of said hub at the front thereof so as to engage said second hub shoulder with the result that said first and second rubber elements have been compressed to an exactly predetermined extent so as to enable said depressions and corners to augment the transmission of torque from the rigid washers to the carrier and to minimize the transmission of sound to said carrier and blades.

References Cited in the file of this patent

UNITED STATES PATENTS

| | | |
|---|---|---|
| 1,482,570 | MacDonald | Feb. 5, 1924 |
| 1,573,961 | Zucker | Feb. 23, 1926 |
| 2,680,559 | Morrill | June 8, 1954 |
| 2,853,140 | Forth | Sept. 23, 1958 |

FOREIGN PATENTS

| | | |
|---|---|---|
| 252,529 | Great Britain | June 3, 1926 |
| 340,642 | France | May 18, 1906 |
| 442,051 | Italy | Nov. 15, 1948 |
| 460,948 | Italy | Jan. 5, 1951 |